United States Patent
Zucchelli et al.

(10) Patent No.: US 6,375,691 B1
(45) Date of Patent: Apr. 23, 2002

(54) FUEL COMPOSITION WHICH COMBUSTS INSTANTANEOUSLY, METHOD AND PLANT THEREFOR

(75) Inventors: Luca Zucchelli, Novate Milanese; Roberto Rizzi, Monza, both of (IT)

(73) Assignee: Pirelli Ambiente S.p.A., Milan (IT)

( * ) Notice: Subject to any disclaimer, the term of this patent is extended or adjusted under 35 U.S.C. 154(b) by 0 days.

(21) Appl. No.: 09/301,309

(22) Filed: Apr. 29, 1999

Related U.S. Application Data
(60) Provisional application No. 60/088,435, filed on Jun. 8, 1998.

(30) Foreign Application Priority Data

Apr. 30, 1998 (EP) .............................. 98830262

(51) Int. Cl.$^7$ .............................. C01L 5/46
(52) U.S. Cl. .............................. 44/605; 44/628; 431/2
(58) Field of Search .............................. 44/281, 553, 589, 44/590, 592, 605, 606, 628; 431/2, 184; 110/262

(56) References Cited

U.S. PATENT DOCUMENTS

| | | | |
|---|---|---|---|
| 1,628,537 A | * 5/1927 | Fisher | |
| 3,852,046 A | * 12/1974 | Brown | 44/553 |
| 4,152,119 A | * 5/1979 | Schultz | 44/1 |
| 4,236,897 A | * 12/1980 | Johnston | 44/553 |
| 4,405,331 A | * 9/1983 | Blaustein et al. | |
| 4,529,407 A | * 7/1985 | Johnston et al. | |
| 4,692,167 A | * 9/1987 | Levasseur | |
| 5,429,645 A | 7/1995 | Benson et al. | |
| 5,643,342 A | * 7/1997 | Andrews | 44/553 |
| 5,743,924 A | * 4/1998 | Dopoy | 44/553 |
| 5,823,764 A | * 10/1998 | Alberti et al. | 431/184 |
| 5,964,166 A | * 10/1999 | Alberti et al. | 110/261 |
| 5,980,595 A | * 11/1999 | Andrews | 44/553 |

FOREIGN PATENT DOCUMENTS

| | | | |
|---|---|---|---|
| EP | 0836048 A1 | * | 4/1998 |
| EP | 0930353 A1 | * | 7/1999 |
| EP | 0953628 A1 | * | 11/1999 |
| FR | 27273861 | * | 1/1975 |
| FR | 2733303 | * | 10/1996 |

OTHER PUBLICATIONS

K. Yasuoka, "Solid Fuel Production From Waste Thermoplastic Resins, Waste Plant Fibre And Other Combustible Materials, By Hot Extrusion Moulding", Derwent abstract for JP 53 071101, (1978).

"Fuel Contaning Crosslinked Ethylene Polymer and Coal Powder for Fluidised Bed and Dust Coal Combustion", Derwent abstract for JP 07 188684, (1995).

* cited by examiner

*Primary Examiner*—Margaret Medley
(74) *Attorney, Agent, or Firm*—Finnegan, Henderson, Farabow, Garrett & Dunner

(57) ABSTRACT

Fuel composition which combusts instantaneously, comprising from 40 to 95% by weight of an instantaneously combusting fossil fuel and from 60 to 5% by weight of a non-fossil solid fuel chosen from the group comprising urban solid waste, elastomeric and non-elastomeric polymer materials and mixtures thereof, this fuel being suitably treated so as to be instantaneously combustible. Method and plant for the instantaneous combustion of the said composition.

11 Claims, 9 Drawing Sheets

FUEL COMPOSITION WHICH COMBUSTS INSTANTANEOUSLY, METHOD AND PLANT THEREFOR

This application is based on European Patent Application No. 98830262.6 filed on Apr. 30, 1998 and U.S. Provisional Application No. 60/088,435 filed on Jun. 8, 1998, the content of which is incorporated hereinto by reference.

The present invention relates to a fuel composition which combusts instantaneously, to an instantaneous combustion method which uses the said composition and to a plant for carrying out the said method.

More particularly, the present invention relates to a fuel composition which combusts instantaneously, comprising a fossil fuel and a non-fossil solid fuel (NFSF) chosen from the group comprising urban solid waste (USW), elastomeric and non-elastomeric polymer materials, and mixtures thereof.

Many methods have up to now been proposed for destroying and/or recovering, at least partly, used plastic wrapping materials, tyres and/or urban solid waste.

However, the problem is very complex since the nature and composition of urban solid waste varies from one place to another and from day to day, and on account of the presence of putrefiable organic waste.

A number of the methods proposed to date envisage the removal of the putrefiable organic phase from the solid products, which can then be dried, ground and agglomerated. Generally, the agglomeration is carried but by compression into granules or tiles which are then destroyed by combustion in ovens with a moving grate or with a rotating drum in which they remain in the high-temperature zone in which the combustion takes place, for a period which is sufficient to obtain virtually complete combustion of the combustible mass. This duration, which can readily be controlled and calculated by dividing the length of the path travelled by the said mass in the said combustion zone by the throughput speed, is at least 1 minute, preferably at least 3 minutes, generally 5 minutes or more.

In the Applicant's view, a drawback of these methods is that these granules or tiles cannot be used to feed instantaneous-combustion burners. Yet another drawback is that the preparation of granules and tiles involves a number of stages, such as a compression stage, which involve a certain expenditure of energy and thus increase the costs, making the abovementioned known methods uneconomical.

A fuel composition has now been found which is produced while avoiding the formation of agglomerates and which makes it possible to economize on large amounts of fossil fuels in the production of energy.

In its first aspect, the present invention relates to a fuel composition which combusts instantaneously, comprising from 40 to 95% by weight of an instantaneously combustible fossil fuel and from 60 to 5% by weight of a non-fossil solid fuel (NFSF) chosen from the group comprising urban solid waste, elastomeric and non-elastomeric polymer materials and mixtures thereof, this fuel being suitably treated so as to be instantaneously combustible.

Preferably, the amount of the said instantaneously combustible fossil fuel is between 50 and 90% by weight and that of the NFSF is between 50 and 10% by weight. Even more preferably, the amount of the said instantaneously combustible fossil fuel is between 60 and 80% by weight and that of the NFSF is between 40 and 20% by weight.

Throughout the present description and the claims, the term "instantaneous combustion" is used to indicate a combustion which includes the combustion of at least 90% by weight of the fuel material fed into a burner in less than 10 seconds, preferably less than 5 seconds, even more preferably less than 3 seconds.

Typical examples of instantaneously combustible fossil fuels are methane, fuel oil, which may be in emulsion form, and fossil coal dust, which may be in the form of an aqueous suspension.

Typical examples of processing to which urban solid waste is subjected before it can be used as instantaneously combustible NFSF comprise, in a non-limiting manner, removal of any putrefiable organic compounds and of any metals, drying, grinding and screening. The urban solid waste thus processed will be referred to hereinbelow as USW. In the case of elastomeric and non-elastomeric polymer materials, suitable processing comprises, in a non-limiting manner, removal of any metals, drying, grinding and screening.

Preferred examples of fuel compositions which are instantaneously combustible according to the present invention are:

coal dust+USW, coal dust+non-elastomeric polymer material, coal dust+USW+non-elastomeric polymer material, coal dust+USW+elastomeric polymer material, coal dust+non-elastomeric polymer material+elastomeric polymer material, coal dust+USW+non-elastomeric polymer material+elastomeric polymer material, methane gas+USW, methane gas+non-elastomeric polymer material, methane gas+USW+non-elastomeric polymer material, methane gas+USW+elastomeric polymer material, methane gas+non-elastomeric polymer material+elastomeric polymer material, methane gas+USW+non-elastomeric polymer material+elastomeric polymer material.

A typical example of a suitable non-fossil solid fuel composition comprising USW and elastomeric and non-elastomeric polymer materials is described in the Applicant's Italian patent application No. MI97A 02890 of Dec. 30, 1997.

Typically, the non-fossil solid fuel composition of the abovementioned Italian patent application No. MI97A 02890 comprises a first fraction consisting of USW, a second fraction consisting of elastomeric material and a third fraction consisting of non-elastomeric polymer material. Preferably, the composition has an apparent density is equal to or less than 0.6 $g/cm^3$ and the amount of each of the three fractions is preselected as a function of the desired calorific power. Typically the value of the apparent density is of from 0.2 to 0.6 $g/cm^3$ and, preferably, of from 0.3 to 0.5.

One of the surprising properties of NFSF, observed during the experimental tests described later, is that it behaves like an ordinary instantaneously combustible solid fuel of average calorific power. It has also been observed that efficient grinding and/or shredding of its components to preset values makes it possible to reduce the content of non-combusted materials both in the heavy ash and in the fly ash, bringing this content to levels similar to those of the fossil fuel.

In general, the process for preparing the solid fuel composition of the abovementioned Italian patent application No. MI97A 02890 comprises the following stages:

a) an urban solid waste is processed in order to remove
   $a_1$) the putrefiable organic fraction by screening,
   $a_2$) ferrous materials, using a magnetic separator, a₃) aluminium, using an eddy-current magnet,
b) the fraction of urban solid waste thus obtained is shredded,
c) a waste material consisting of non-elastomeric polymer material is shredded,
d) the abovementioned fractions of urban solid waste and of non-elastomeric polymer material shredded are dried to a moisture content of less than or equal to 10%,
e) the abovementioned fractions are ground,
f) an elastomeric material is ground and stripped of any ferrous material associated therewith,
g) the abovementioned ground fractions are mixed together in a weight ratio which is predetermined as a function of the desired calorific power.

Examples of suitable elastomeric materials are used tyres. Examples of suitable non-elastomeric polymer materials are packaging and wrapping made of thermoplastic and/or thermosetting materials. Typical examples of thermoplastic materials mainly used in the production of wrapping material are: PE, LDPE, HDPE, PP, PET, polystyrene, ethylene/$C_4$–$C_{12}$ α-olefin co-polymers, vinyl polymers and copolymers, and the like.

In its second aspect, the present invention relates to a fuel composition which combusts instantaneously, comprising from 40 to 95% by weight of an instantaneously combusting fossil fuel and from 60 to 5% by weight of particles smaller than 1 mesh (15 mm) in size of a fuel material chosen from the group comprising USW, elastomeric and non-elastomeric polymer materials, and mixtures thereof.

Preferably, at least 90% by weight of the abovementioned particles are smaller than 2 mesh (7.5 mm) in size. Even more preferably, at least 50% by weight of the abovementioned particles are smaller than 4 mesh (3.75 mm) in size.

Within the said composition, the granules of elastomeric polymer, if present, are less than 5 mm in size.

The relatively large size of the NFSF particles constitutes an entirely unexpected characteristic of the present invention. The reason for this is that traditional instantaneously combusting fuel materials consist of gaseous and liquid fossil fuels. However, a solid fossil fuel, such as coal, is suitable for use as an instantaneously combusting fuel material only after it has been very finely ground until 99% of the particles thereof are less than 100 mesh (0.15 mm) in size and 70% of these particles are less than 200 mesh (0.075 mm) in size. Thus, it was not foreseeable that NFSF would be suitable for instantaneous combustion even though its particles are at least 50 times as large as those of coal dust.

Moreover, it was considered that the essential element had to be the size of the elastomeric polymer granules and that they had to be similar in size to that of granules of coal dust. However, it was found, surprisingly, that it is sufficient for the elastomeric polymer granules to be less than 5 mm in size.

Furthermore, in the case of the composition which constitutes the second aspect of the invention, the amount of the said instantaneously combusting fossil fuel is preferably between 50 and 90% by weight and that of the said fuel material is between 50 and 10% by weight. Even more preferably, the amount of the said instantaneously combusting fossil fuel is between. 60 and 80% by weight and that of the said fuel material is between 40 and 20% by weight.

A typical example of a suitable non-fossil solid fuel composition comprising USW and elastomeric and non-elastomeric polymer materials and of a method for producing it is described in the abovemetioned Italian patent application No. MI97A 02890.

In a preferred embodiment of the present invention, the fuel material chosen from the group comprising USW, elastomeric and non-elastomeric polymer materials and mixtures thereof consists of a mixture comprising from 40 to 80% by weight of dry urban solid waste, from 10 to 50% by weight of elastomeric material and from 10 to 50% by weight of non-elastomeric polymer material. Even more preferably, this mixture comprises from 60 to 80% by weight of dry urban solid waste, 10 to 30% by weight of elastomeric material and from 10 to 30% by weight of non-elastomeric polymer material.

In its third aspect, the present invention relates to a combustion method in which the flame of a burner of an instantaneous-combustion boiler is fed with a flow of instantaneously combusting fuel material comprising from 40 to 95% by weight of an instantaneously combusting fossil fuel and from 60 to 5% by weight of a fuel material chosen from the group comprising USW, elastomeric and non-elastomeric polymer materials and mixtures thereof, which has been suitably treated so as to be instantaneously combustible.

In a preferred embodiment, the said fossil fuel is fed through a burner of known type, while the instantaneously combusting non-fossil fuel is fed into the region of the boiler known as the "fire area", i.e. the region of the boiler in which the temperature is above 1400° C. Generally, the temperature of the fire area is between 1500 and 2000° C.

Typically, the said fuel material is instantaneously combustible when it consists of particles less than 1 mesh (15 mm) in size. Preferably, at least 90% by weight of the abovementioned particles are less than 2 mesh (7.5 mm) in size. Even more preferably, at least 50% by weight of the abovementioned particles are less than 4 mesh (3.75 mm) in size. The elastic polymer, if present, is preferably in the form of granules less than 5 mm in size.

Preferably, the flow of instantaneously combusting fuel material used in the combustion method according to the present invention comprises from 50 to 80% by weight of instantaneously combusting fossil fuel and from 50 to 20% by weight of fuel material chosen from the group comprising USW, elastomeric and non-elastomeric polymer materials and mixtures thereof. Even more preferably, the amount of the said instantaneously combusting fossil fuel is between 60% and 80% by weight and that of the said fuel material is between 40 and 20% by weight.

The method of the present invention has proved to be particularly suitable for running power plants, i.e. plants generally dedicated to the production of steam for the production of electrical energy and/or for remote heating, and which produce an amount of steam greater than 40 thermal megawatts (tMW). Generally, the said power plants are considered small when they produce less than 50 tMW, medium-sized when they produce from 50 to 500 tMW and big when they produce more than 500 tMW.

In another embodiment thereof, the combustion method of the present invention comprises feeding an instantaneously combusting fuel material, comprising at least one fossil fuel and a non-fossil fuel chosen from the group comprising USW, elastomeric and non-elastomeric polymer materials and mixtures thereof, into a zone of a boiler which is at a temperature such that the level of non-combusted materials in the heavy ash is maintained at less than 50% by weight.

In another embodiment thereof, the combustion method of the present invention comprises feeding a boiler with an instantaneously combusting fuel material comprising at least one fossil fuel and a non-fossil fuel chosen from the group comprising USW, elastomeric and non-elastomeric polymer materials and mixtures thereof, in which the particle size of the said non-fossil fuel has been predetermined such that the level of the non-combusted materials in the heavy ash is maintained at less than 50% by weight.

In its fourth aspect, the present invention thus relates to a plant for the instantaneous combustion of at least one instantaneously combusting fossil fuel, comprising a boiler, at least one burner, a combustion zone and a system for feeding in at least one said instantaneously combusting fossil fuel, characterized in that it also comprises a device for feeding a non-fossil solid fuel (NFSF) into the said combustion zone.

According to two preferred embodiments of the present invention, the said NFSF supply device is of the mechanical or pneumatic type. In particular, the mechanical supply device is preferably an Archimedean screw device.

The invention will now be illustrated in greater detail by means of the description of experimental tests and figures, which are given purely as examples and should thus not be interpreted as limiting the scope of the present invention in any way.

In the attached figures

In FIGS. 7–9, the same numbers correspond to the same components.

FIG. 7 shows, schematically, a typical power plant which is suitable for generating steam by means of the instantaneous combustion of the fuel material of the present invention.

This plant comprises a steam-generating boiler (18A) which has several burners (12). These burners can be, for example, of the type illustrated schematically in FIGS. 8 and 9 in which they are labelled with the same reference number 12.

The general structure of the boiler, or steam generator, (18A) is of a known type and is briefly described hereinbelow with particular reference to the specific properties which are useful for illustrating the present invention.

Figure 7:
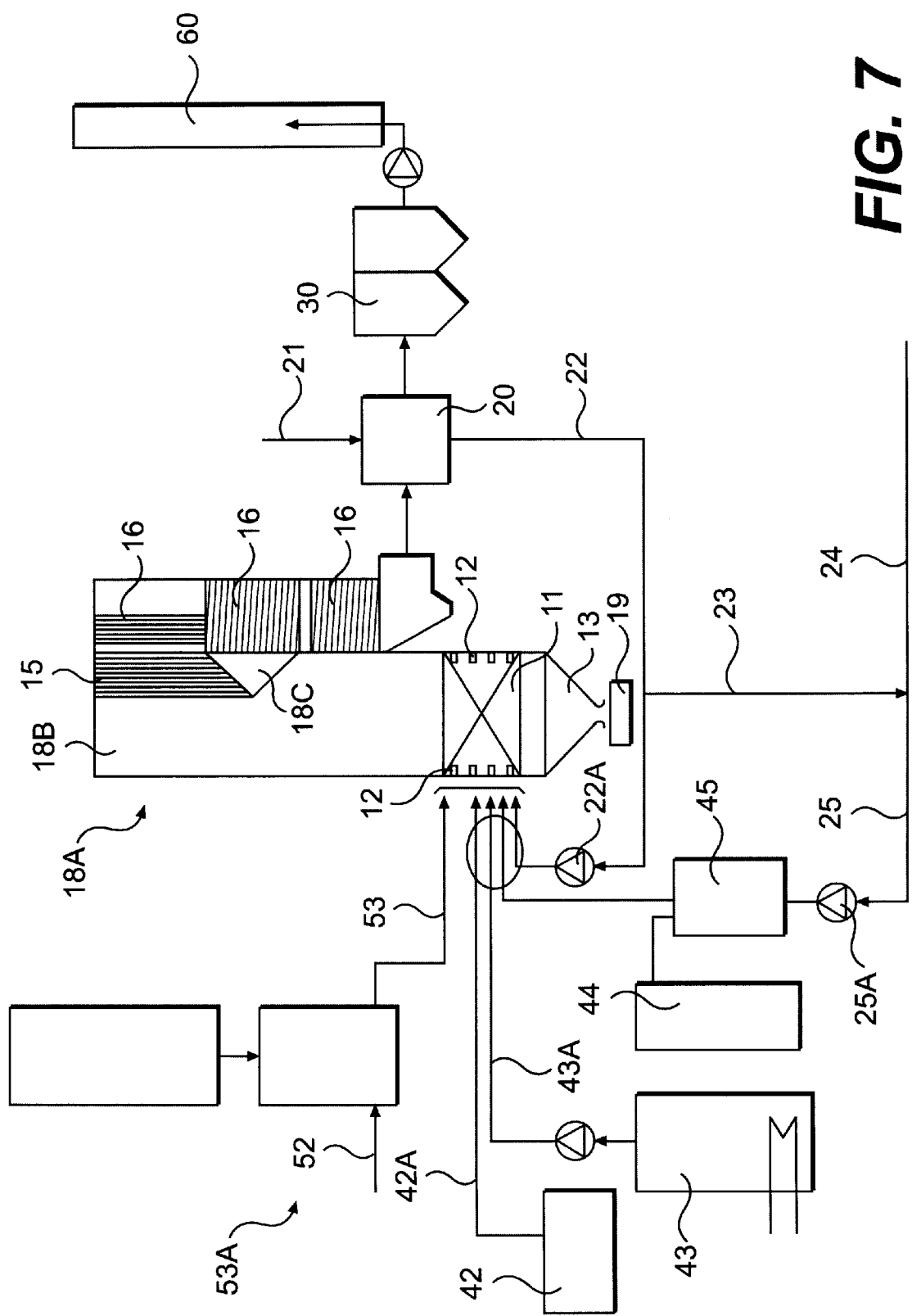
FIG. 7 is a schematic representation of a power plant for the combustion of an instantaneously combusting fuel material of the present invention.

Typically, the boiler (18A) has a plurality of burners (12) (for example up to 60), the precise number of the said burners (12) being predetermined from one instance to another depending on the capacity of the boiler (18A). The said burners (12) can be arranged on a single wall, on two opposite walls (as illustrated in FIG. 7) or in the corners of the combustion zone (11), also called fire zone. The configuration of the said array of burners (12) will be preselected from one instance to another depending on criteria which are well known to those skilled in the art, as a function of the predetermined thermal properties for the combustion zone (11).

In the combustion zone (11) defined in correspondence with the burners (12), the flames generated by these burners (12) maintain a temperature of typically between 1500 and 2000° C.

Structures and/or members capable of collecting and removing the ash are present at the bottom of the boiler. Typical examples of the said structures and members are a hopper (13) for collecting the ash and a conveyor belt (19) for removing it.

In the top part of the boiler (18A), in relation to a narrowing of the passage cross-section usually referred to as the "nose of the boiler" (18C), the vapours arising from the combustion zone (11) arrive at a vapour exit zone (18B), in which the vapours have a temperature of about 1150–1250° C. Next, the vapours cross a zone, referred to collectively as the "convective bank", which comprises a plurality of heat exchangers (15, 16) (commonly referred to as overheater, reoverheater or economizer) to which they give up heat to generate steam for remote heating and/or for actuating one or more turbines for the production of electrical energy.

After they have passed through the said convective bank, the vapours, which have a temperature of about 500–600° C., are conveyed to the chimney (60) via a filter array (30) in which any light non-combusted material present in these vapours are processed.

Before entering the said filter array (30), the vapours arising from the said convective bank pass through an exchanger (20) in which they preheat an inlet flow of cold air (21), bringing it to about 250–300° C.

The flow of air thus preheated (22) is fed, via a ventilator (22A) or another equivalent device, into the burners (12) as separate flows or as a single flow, according to the specific constructional characteristics of the plant.

A fraction (23) of the flow of preheated air (22) is conveniently mixed with a flow of cold air (24) in order to form a flow of air (25) at about 150° C. The said flow of air (25) is fed, through a ventilator (25A), to a mill (45) where it acts as a means of transporting a finely ground coal in which typically 99% of the particles are less than 100 mesh and 77% are less than 200 mesh in size.

In order to produce this coal dust, the mill (45) is fed with coarse-sized coal obtained from a silo (44).

Supply flows (42A) and (43A) of methane and fuel oil, originating, respectively, from a methane gas distribution network (42) and from a heated tank (43) of fuel oil, also arrive at the burners (12).

For simplicity, in FIG. 7 only one system for supplying methane gas, fuel oil and coal dust to the entire array of burners (12) has been represented. Preferably, each burner (12) will, however, be provided with its own separate supply system.

Naturally, a person skilled in the art will appreciate that the scheme represented in FIG. 7 has been given purely by way of illustration and that many other specific forms of plant embodiments can be envisaged, such as, for example, boilers with vapour tubes or with a diathermic fluid, which can be significantly far-removed from the scheme of FIG. 7. Nevertheless, these plants are all compatible with the objectives of the present invention since they are capable of achieving instantaneous combustion.

For the purposes of the present invention, an instantaneous-combustion power plant also comprises a system (53A) which is capable of feeding the flame of at least one burner (12) with a flow (53) of NFSF having a controlled and predetermined particle size.

In relation to the specific technical requirements or to preselected forms of construction, the flow (53) of NFSF is conveyed by a suitable carrier fluid (52), typically air, and arrives directly at one or more burners (12) or at a preselected zone of the boiler, through one or more independent adduction tubes. In any case, the boiler zone preselected for supplying NFSF according to the present invention will be characterized by a temperature which is high enough to minimize the amount of non-combusted particles which collect in the hopper (13). Expediently, the said zone is the abovementioned combustion zone (11) in which the temperature is preferably at least 1500° C.

Examples of such NFSF supply systems are described earlier with reference to FIGS. 8 and 9.

Figure 8:
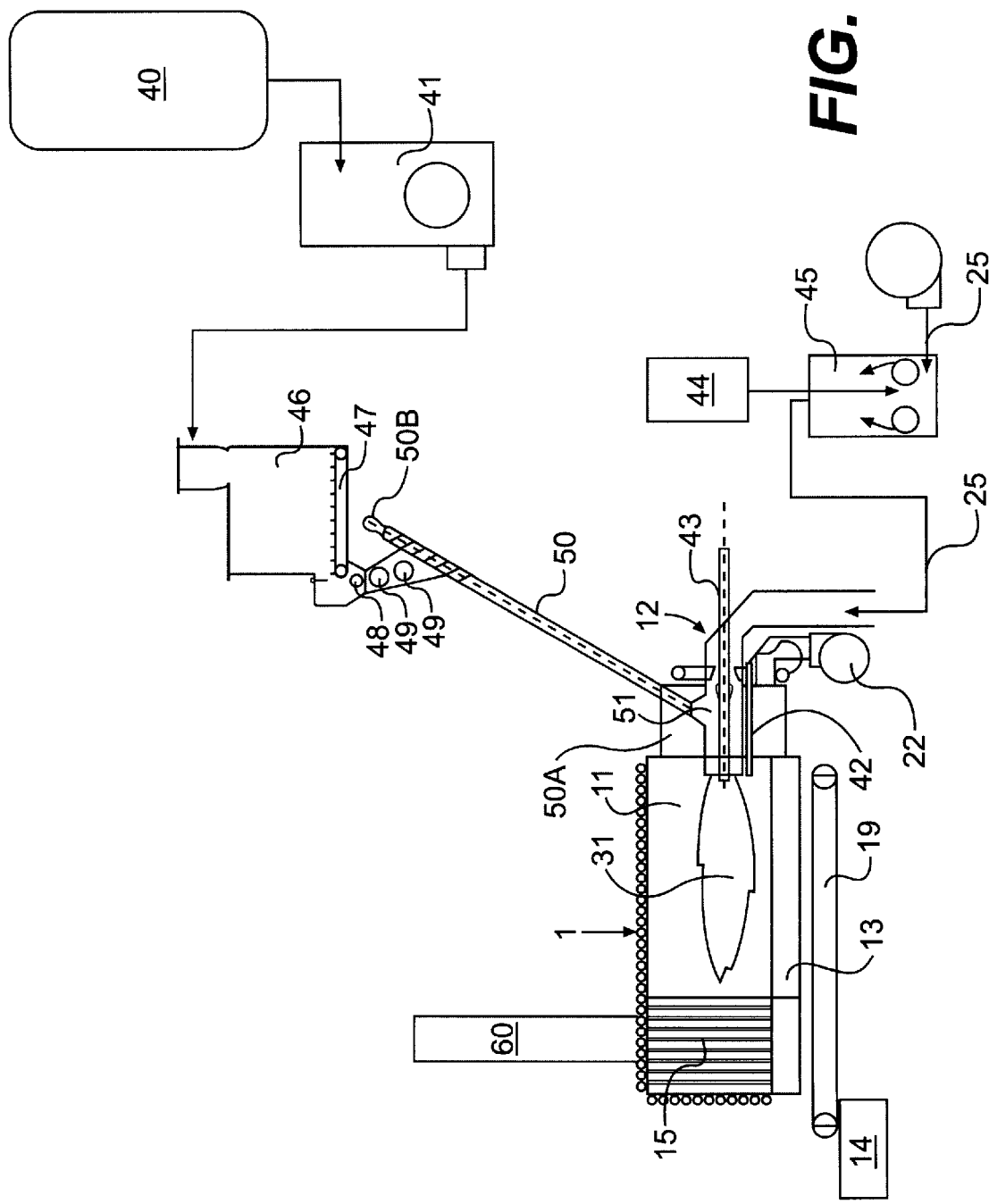
FIG. 8 is a schematic representation of a first system for supplying an instantaneously combusting fuel material of the present invention into an experimental boiler.

FIG. 8 shows a mechanical NFSF supply system in which the NFSF, stored in a first silo (40) passes to a blade mill (41) in which it is appropriately ground and then conveyed to a second silo (46) which can also serve as a receiver tank. The second silo (46) has a moving base in (47) consisting of a conveyor belt which discharges a preselectable amount of NFSF over time into a twin Archimedean screw (48) which converges towards the centre. Wheels (49) drive the NFSF towards an Archimedean screw (50) which emits it, through an aperture (51), into the flow of coal dust carried by the carrier air (25) conveyed to the flame (31) of the burner (12).

The silos (46, 47) are lined with an anti-adhesive epoxy varnish and have an upper aperture fitted with a movable door to allow the operations of loading of the product and, at the same time, airtightness with respect to atmospheric agents.

The Archimedean screw (50) passes through the air-burner tank (50A), inside which temperatures of about 300° C. are reached. This tank is therefore fitted with a water jacket (not shown) to maintain the NFSF at a temperature below 200° C., since, above this temperature, the NFSF tends to soften and to become sticky, thus making it difficult to supply to the burner. In addition, the entire Archimedean screw (50) has been entirely lagged with ceramic fibre.

The Archimedean screw (50) is driven by a first electric motor (50b) coupled to a reduction unit and has a speed of 140 revolutions/minute and a carrying capacity of 1200 kg/h.

There are two wheels (49) and these are controlled by a second electrical motor (not shown) provided with a reduction unit. The said wheels (49) are connected together by means of a system (not shown) comprising a trapezoidal belt provided with a screw coupling which connects two pulleys of different diameter so as to make the lower wheel rotate at a faster speed than the upper wheel.

Figure 9:
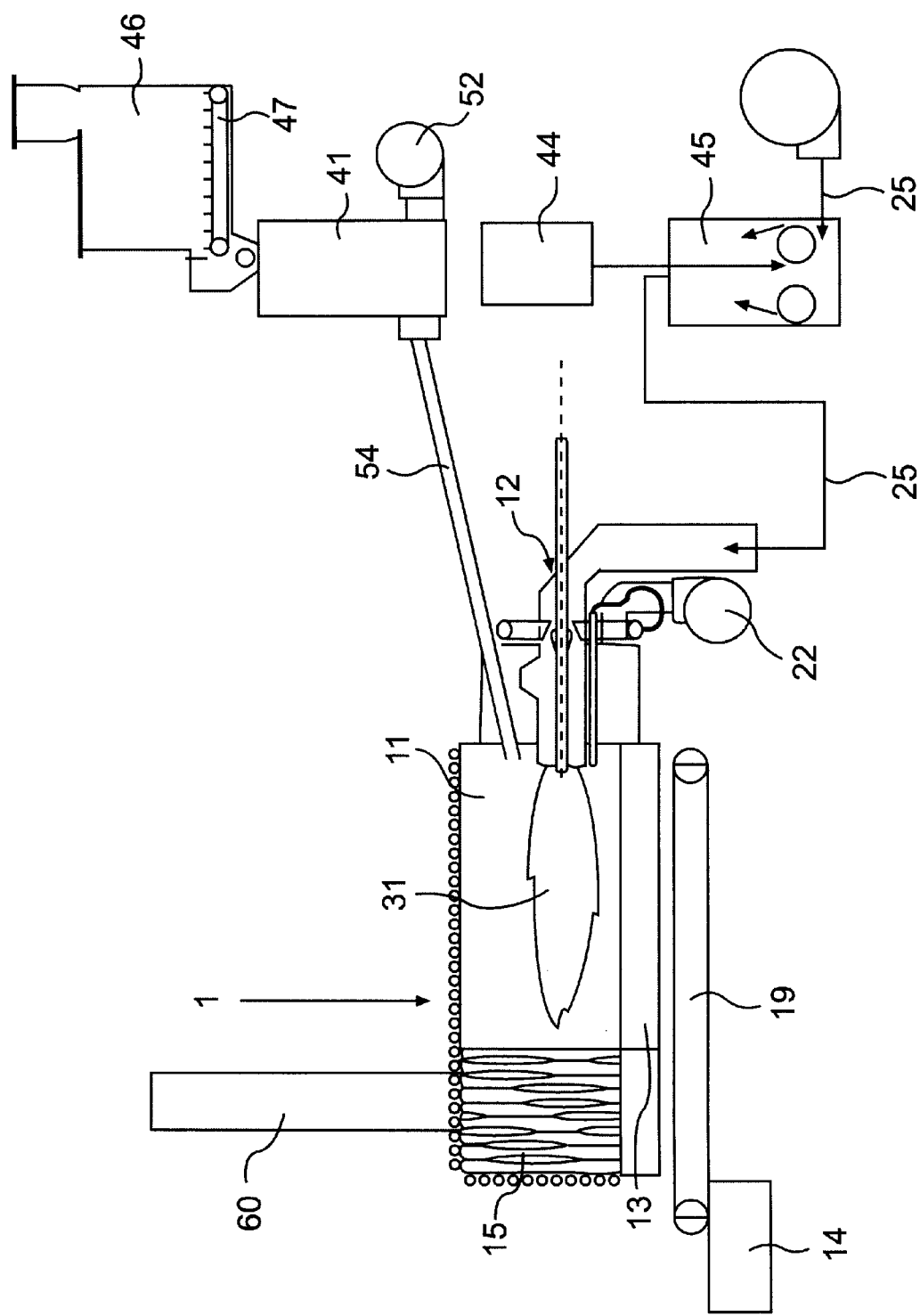
FIG. 9 is a schematic representation of a second system for supplying an instantaneously combusting fuel material of the present invention into an experimental boiler.

FIG. 9 illustrates an alternative pneumatic NFSF supply system, in which the NFSF passes from a silo (46) to a blade mill (41) connected to a source (52) of carrier air which, via tubing (54), pneumatically conveys the NFSF, which has been appropriately ground, to the fire area (11) of the boiler (1). At the same time, the coal dust is also fed in pneumatically in a manner entirely similar to that described with regard to FIG. 8.

EXPERIMENTAL SECTION

I. Fuel materials

The non-fossil solid fuel (NFSF) had an average composition of 70% by weight of USW, 15% by weight of non-elastomeric polymer materials (plastic wrapping materials) and 15% by weight of elastomeric polymer materials (used tyres stripped of the metal carcase and shredded into particles less than 5 mm in size).

Before being conveyed to the combustion zone, the said NFSF was dried and ground until all the particles were practically smaller than 1 mesh in size and 50% of them were smaller than 4 mesh in size. The apparent density of the so obtained NFSF was of about 0.4 g/cm$^3$.

Table 1 below shows the results of the physico-chemical analysis of the said NFSF and of a South African coal normally used in electric power stations, in the form of a dust in which at least 70% of the granules are smaller than 200 mesh in size.

TABLE 1

| Results | Method | Dry coal | Dry NFSF |
| --- | --- | --- | --- |
| Coal (%) | ASTM D 5373 | 76.61 | 54.11 |
| Hydrogen (%) | ASTM D 5373 | 3.63 | 7.13 |
| Nitrogen (%) | ASTM D 5373 | 1.53 | 1.05 |
| Sulphur (%) | ASTM D 4239 | 0.63 | 0.108 |
| Ash (%) | ASTM D 5142 | 10.89 | 11.99 |
| Oxygen (%) | calculated | 6.71 | 25.33 |
| Moisture (%) | ASTM D 5142 | — | — |
| Higher calorific power (Kcal/kg) | ASTM D 3286 | 7085 | 5803 |
| Lower calorific power (Kcal/kg) | calculated | 6899 | 5392 |
| Volatile substances (%) | ASTM D 5142 | 25.59 | 81.61 |
| Chlorine (%) | ASTM D 2361 | <0.1 | 0.27 |
| Alpha stoichiometry[1] (kg/kg) | calculated | 9.87 | 7.66 |

[1]The term "Alpha stoichiometry" indicates the stoichiometric amount of air, by weight, required to burn 1 kg of the compound under consideration.

On the other hand, Table 2 below gives the average physicochemical values for natural gas (methane) used in the same plant. The chemical values were determined by gas chromatography.

TABLE 2

| Results | Methane gas |
| --- | --- |
| Helium (mol %) | 0.04 |
| Methane (mol %) | 90.89 |
| Ethane (mol %) | 4.26 |
| Isobutane (mol %) | 0.17 |
| Isopentane (mol %) | 0.05 |
| Hexanes + higher hydrocarbons (mol %) | 0.05 |
| Nitrogen (mol %) | 2.92 |
| Carbon dioxide (mol %) | 0.19 |
| Propane (mol %) | 1.15 |
| n-Butane (mol %) | 0.24 |
| n-Pentane (mol %) | 0.04 |
| Higher calorific power (Kcal/SMC[2]) | 9309 |
| Lower calorific power (Kcal/SMC[2]) | 8400 |

[2]SMC = m$^3$ at 15° C. and at 1.01326 bar (atmospheric pressure)

II. Plant

The experimental tests were carried out in an experimental power plant (48 tMW) with instantaneous combustion, which was particularly suitable for evaluating the properties of the burners and of the fuel materials.

The said plant had the structure illustrated in FIG. 8.

In particular, the boiler in this experimental plant has a horizontal prism-shaped combustion chamber of the twin-drum type and a maximum capacity of 70 t/h of steam at 29 bar.

In addition, the said combustion chamber is partially refractory so as to control the heat exchange with the flame and to allow an efficient evaluation of the thermal behaviour of a power plant. This chamber also has many points of access which allow the observation and measurement of the flame along the entire combustion chamber.

The control and regulation system for the plant is of the semi-automatic type and reports, in a control room, all the process data where these data are acquired automatically and continuously.

For continuous analysis of the vapours, the plant is equipped with the following analysers:
Siemens IR ULTRAMAT™ 5 $NO_x$ analyser with a scale range from 0 to 800 mg/Nmc and equipped with an $NO_2$/NO converter—precision <0.5%, base scale (b.s.)
Siemens IR ULTRAMAT™ 5 CO analyser with a scale range from 0 to 800 mg/Nmc—precision <0.5% b.s.
Siemens IR ULTRAMAT™ 5 $CO_2$ analyser with a scale range from 0 to 20%—precision <0.5% b.s.
Siemens OXYMAT™ 5 paramagnetic $O_2$ analyser with a scale from 0 to 5%, from 0 to 10% and from 0 to 25%—precision <0.5b.s.
Siemens IR ULTRAMAT™ 5 $SO_2$ analyser with a scale range from 0 to 3000 mg/Nmc—precision <0.5% b.s.

A suction pyrometer is installed on the bottom wall of the boiler, for the continuous measurement of the temperature of the vapours leaving the combustion chamber, before they pass through the convective bank.

An endoscope is installed on the front of the boiler to allow overall monitoring of the flame produced. A commercial telecamera with an RGB outlet is mounted on the endoscope eyepiece; the signal is sent to a digital image acquisition system which, with the aid of "image processing" software, analyses the shape of the flames and of the temperature peaks.

The burners are of the triple-flow and three-fuel "low $NO_x$" type and were set up to ensure the best operating conditions in terms of emissions of $NO_x$, CO and non-combusted materials in the ash.

The burners are of the circular type and comburent air is divided, around the longitudinal axis of the burner, into three helical flows.

The central primary air (25) also constitutes the fluid for the pneumatic transportation of the coal dust.

The vapour analysis system was integrated by means of a movable station capable of sampling dioxins, furans, PAHs (polycyclic aromatic hydrocarbons), heavy metals, halohydric acids, etc.

The addition of NFSF to the flow of dust was carried out via a side inlet (51) already present on the burner and normally used to draw in cooling air. No modification of the conventional combustion plant was thus necessary.

This supply system makes it possible to introduce from 10 to 30% by weight of NFSF into the flow of coal dust without varying the air/coal ratio and without giving rise to any appreciable disruptions in the fluid dynamics of the burner.

III. Short-duration Co-combustion Tests

1. NFSF/methane Gas Co-combustion Two tests each lasting about 15–20 minutes were carried out.

In the first test, the gas flow rate was about 2900 Nmc/h, that of the primary air was about 9 t/h and that of the NFSF was about 1670 kg/h.

In the second test, the gas flow rate was about 2900 Nmc/h, that of the primary air was about 9 t/h and that of the NFSF was about 690 kg/h.

As regards the flame behaviour, the visual test made it possible to observe that:
the discharge of the NFSF from the mouth of the burner was uniform and finely dispersed, both spatially and over time;
laterally to the flame, there was no obvious presence of NFSF apart from the existence of a few particles of burning material slightly downfield of the mouth of the burner;
the amount of non-combusted material which settled in the hopper placed at the bottom of the boiler was very low (as confirmed later by the ash values) and therefore did not concern the first half of the boiler;
the amount of non-combusted material was also low and of small dimensions at the inlet of the convective bank;
a few particles of material of plastic consistency tended to be deposited on the glass in the back door.

2. NFSF/coal Dust Co-combustion

A test lasting about 30 minutes was carried out.

The flow rate of the coal was about 3 t/h, that of the NFSF was about 600 kg/h (about 20% by weight relative to the coal dust) and that of the primary air was about 9 t/h.

Under these conditions, it was found that:
the coal flame did not make it possible to locate the NFSF leaving the burner, nor in the central zone of the flame;
it was possible to distinguish the NFSF only in the peripheral zones and at the end of the flame;
from the back of the boiler, it was, however, possible to see material fall into the hopper in similar measure to that found with methane gas.

No appreciable differences as regards the functioning with methane gas were observed in the complex.

The only item of critical technical data is that in the operation with methane gas, the temperature of the vapours leaving the combustion chamber were maintained at about 850° C., whereas, in the operation with coal, this temperature was moderately lower (about 720° C.).

In order to return to a temperature of about 850° C., the flow rates of fossil fuel were increased in the following tests.

IV. Long-duration Co-combustion Tests

1. Characterization Tests

Before carrying out the co-combustion tests, two tests were carried out with coal dust alone, in order to gather as much data and measurements as possible regarding the typical functioning of the plant fed only with coal dust, in order then to compare them with those of NFSF/coal dust co-combustion.

The duration of the tests were conditioned by the needs for long periods of sampling to measure the microcontaminants.

In particular, the operations below were carried out in each of the two tests concerned:
sampling of the coal dust in order to determine the relative particle size distribution curves according to Rosin & Rammler;
vapour analysis ($O_2$, $NO_x$, CO, $CO_2$, $SO_2$);
sampling of the particulates in the vapours in order to determine the concentration of ash and the content of non-combusted materials;

sampling of the heavy ash in order to determine the residual percentage of the starting fuel material and the concentration of non-combusted materials;

sampling of the process effluents for the determination of dioxins, furans, PAHs, heavy metals and halohydric acids.

2. Baseline Coal Test

This test was started with a coal load of about 4 t/h, corresponding to about 33 tMW (100% thermal load of the burner), and with a primary air flow rate of about 9.5 t/h.

The flame produced under these conditions was stable, attached to the burner, of elongated shape, typical of burners with large air "staging".

Figure 1:
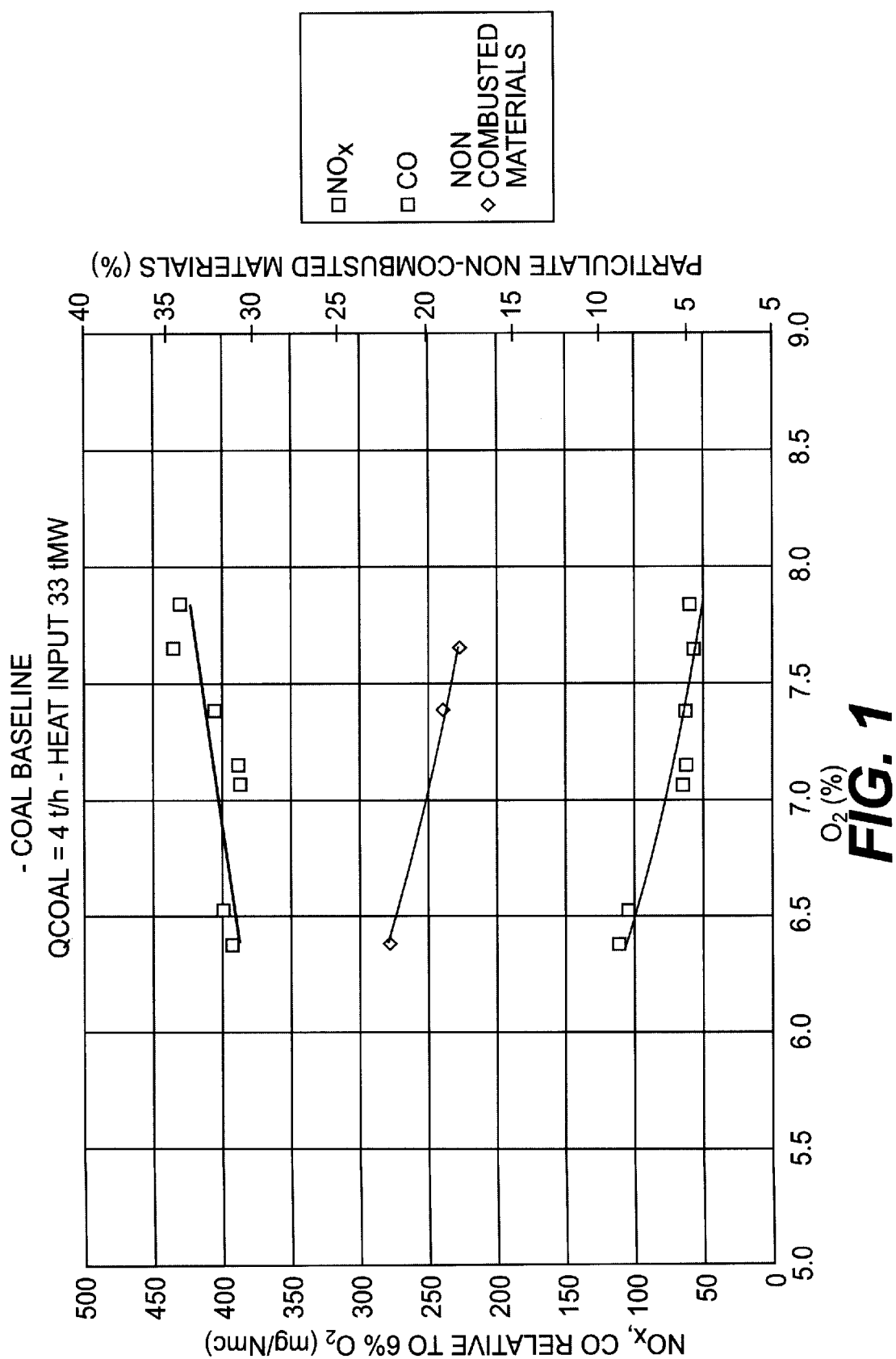
FIG. 1 is a diagram which shows the values of nitrogen oxides ($NO_x$), of CO and of non-combusted materials which are formed as the amount of oxygen is varied in a combustion test carried out with coal dust alone.

The emissions in terms of $NO_x$, CO and non-combusted materials in the fly ash are given in FIG. 1, as the amount of excess air changes ($O_2\%$ in the vapours).

Figure 2:
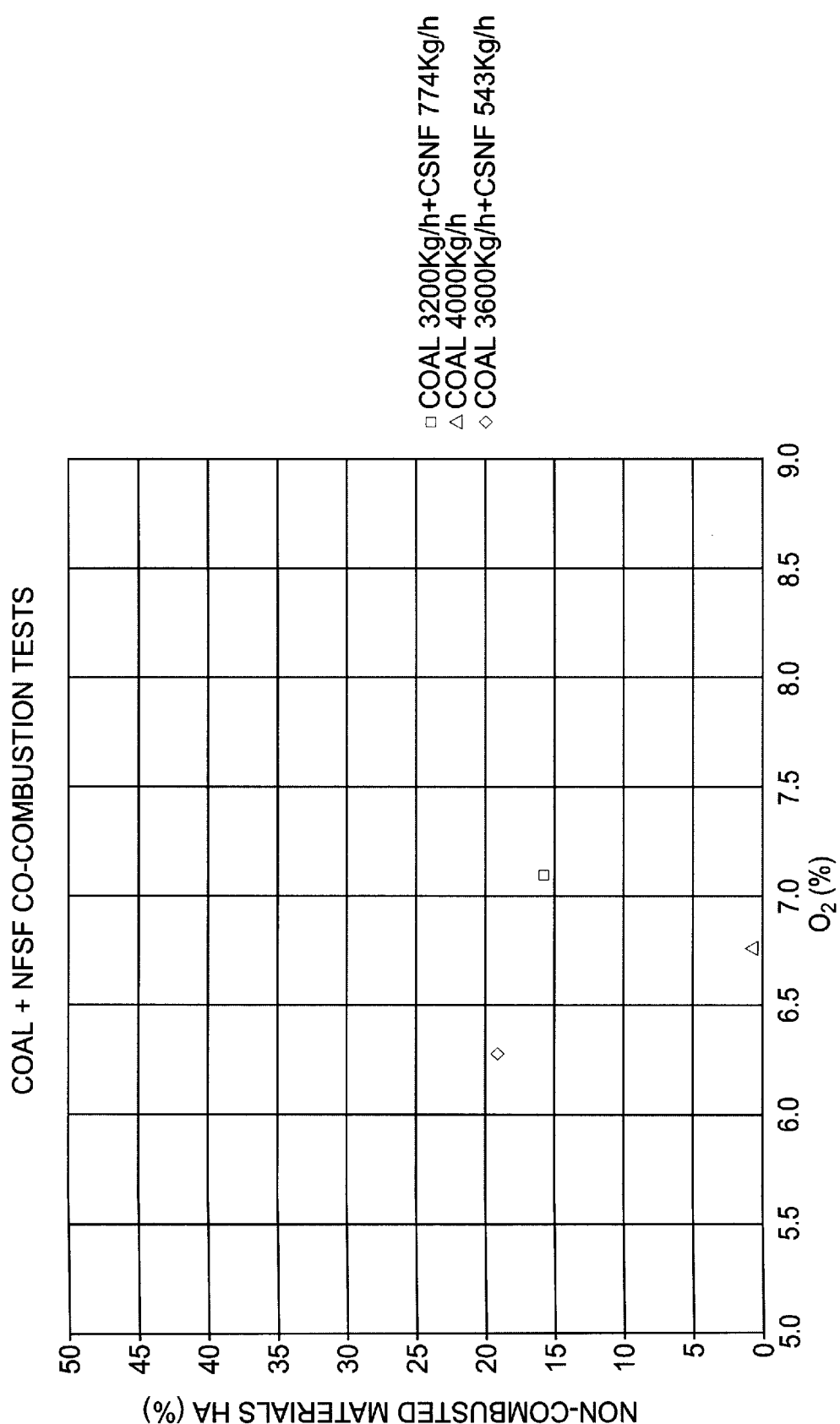
FIG. 2 is a diagram which shows the values of heavy ash (HA) which are formed in a combustion test carried out with carbon dust alone, in comparison with two co-combustion tests carried out with various amounts of coal dust and of NFSF.
Figure 3:
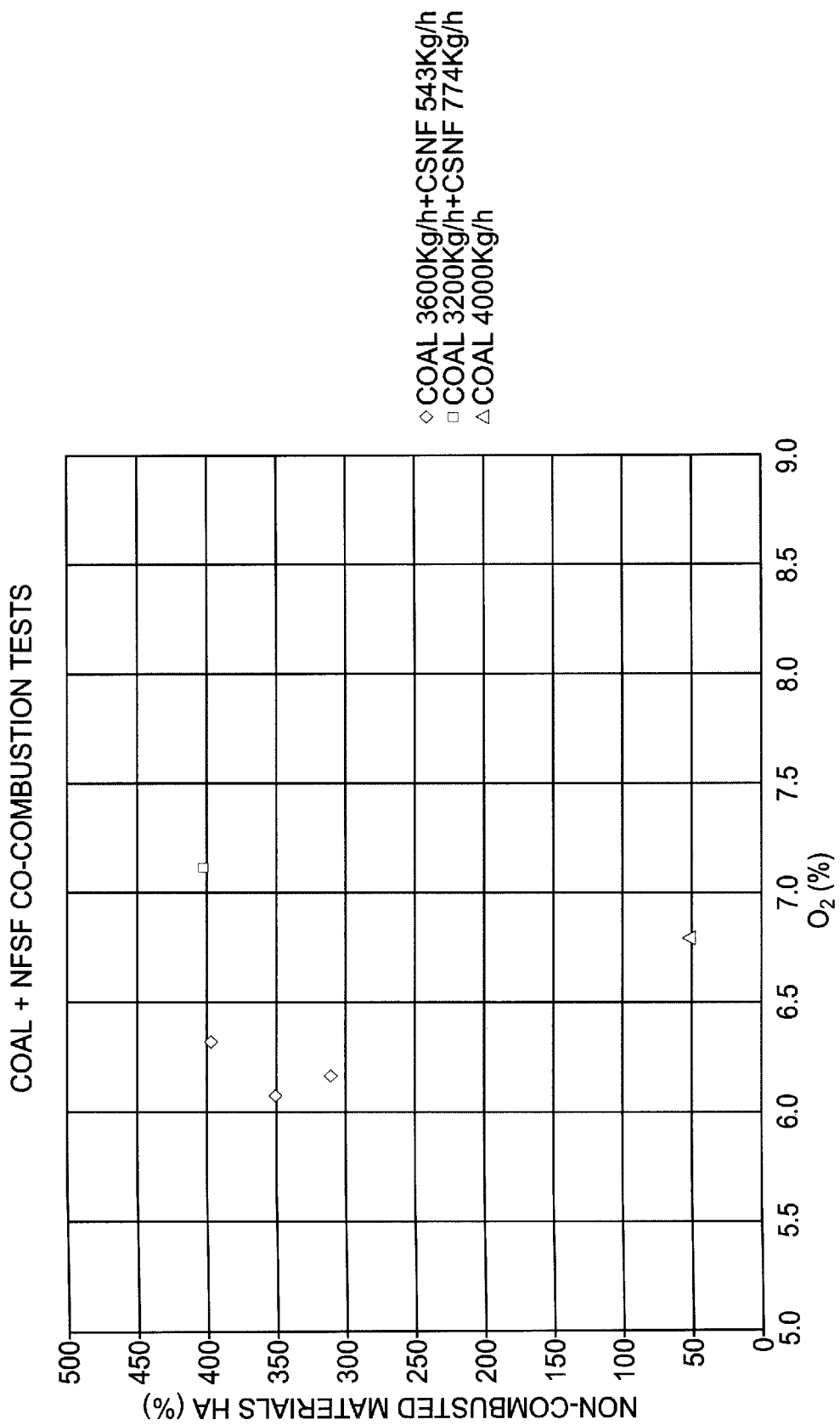
FIG. 3 is a diagram which shows the values of non-combusted materials found in the heavy ash in a combustion test carried out with coal dust alone, in comparison with two co-combustion tests carried out with various amounts of coal dust and of NFSF.

The heavy ash (HA) removed from the boiler hopper was characterized and expressed both in terms of residual percentage relative to the starting fuel material (FIG. 2), and in terms of the non-combusted materials (FIG. 3). These data are given by way of reference to evaluate the results obtained in the NFSF/coal dust co-combustion.

3. NSFS/coal Dust Co-combustion Test

The test was carried out after the boiler had been brought to the operating conditions, with coal dust alone.

The overall heat input of the co-combustion was equal to that in the above baseline test: coal=3.6 t/h, NFSF=543 kg/h.

The heat input due to the NFSF was equal to about 10% of the total 33 tMW, while the NFSF/coal weight ratio was 15%.

The flame produced under these conditions did not differ substantially from that obtained with coal alone. It was stable, attached to the burner and the flame reading signal (CCRT FLUX 3900 model, IR) did not experience any changes. The presence of the NFSF was detected only by particles of material which continued to burn even outside the flame, in the final path of the combustion chamber.

Figure 4:
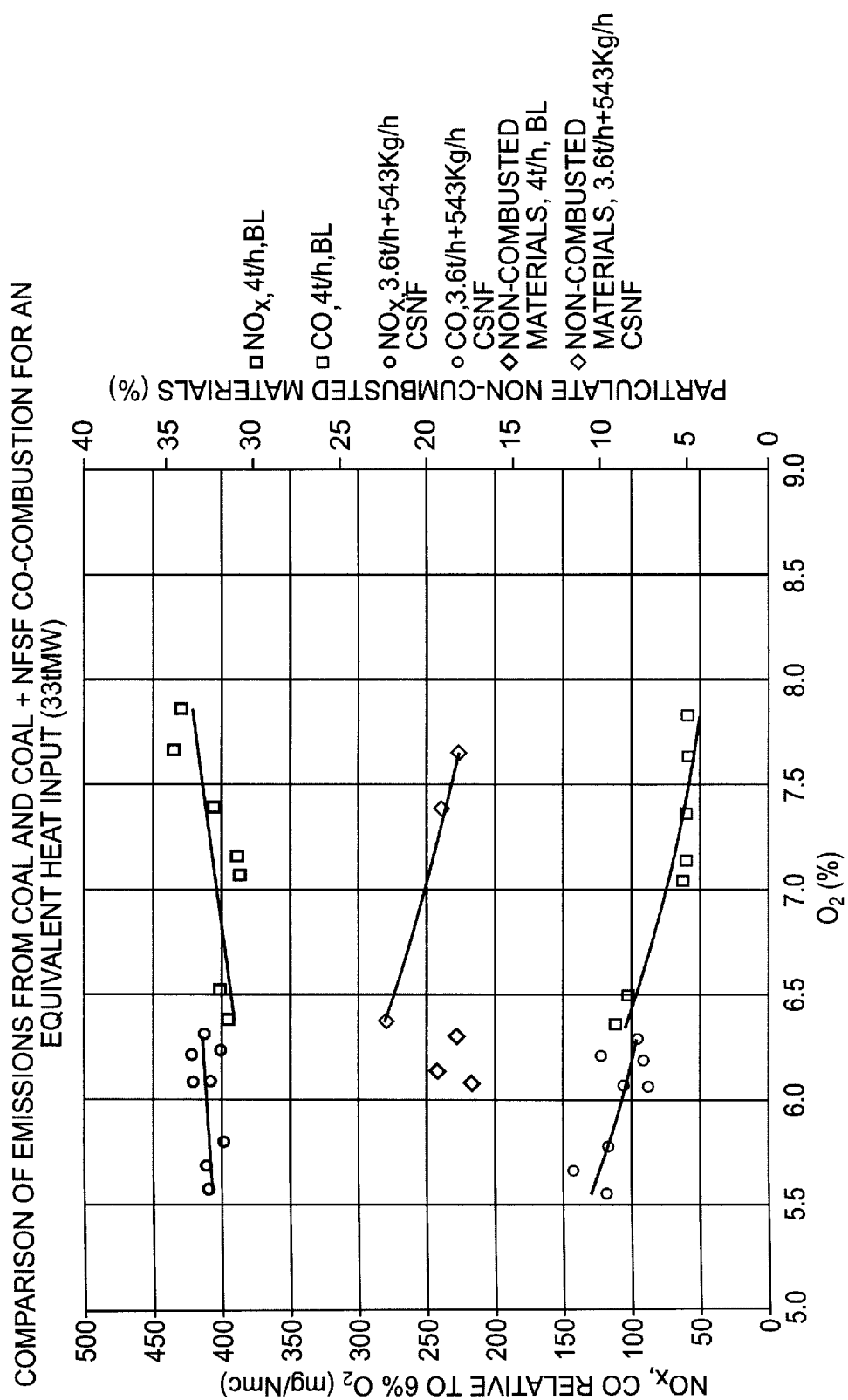
FIG. 4 is a diagram which shows the values of nitrogen oxides ($NO_x$), of CO and of non-combusted materials which are formed in a combustion test carried out with coal dust alone, in comparison with a coal dust/NFSF co-combustion test.
Figure 5:
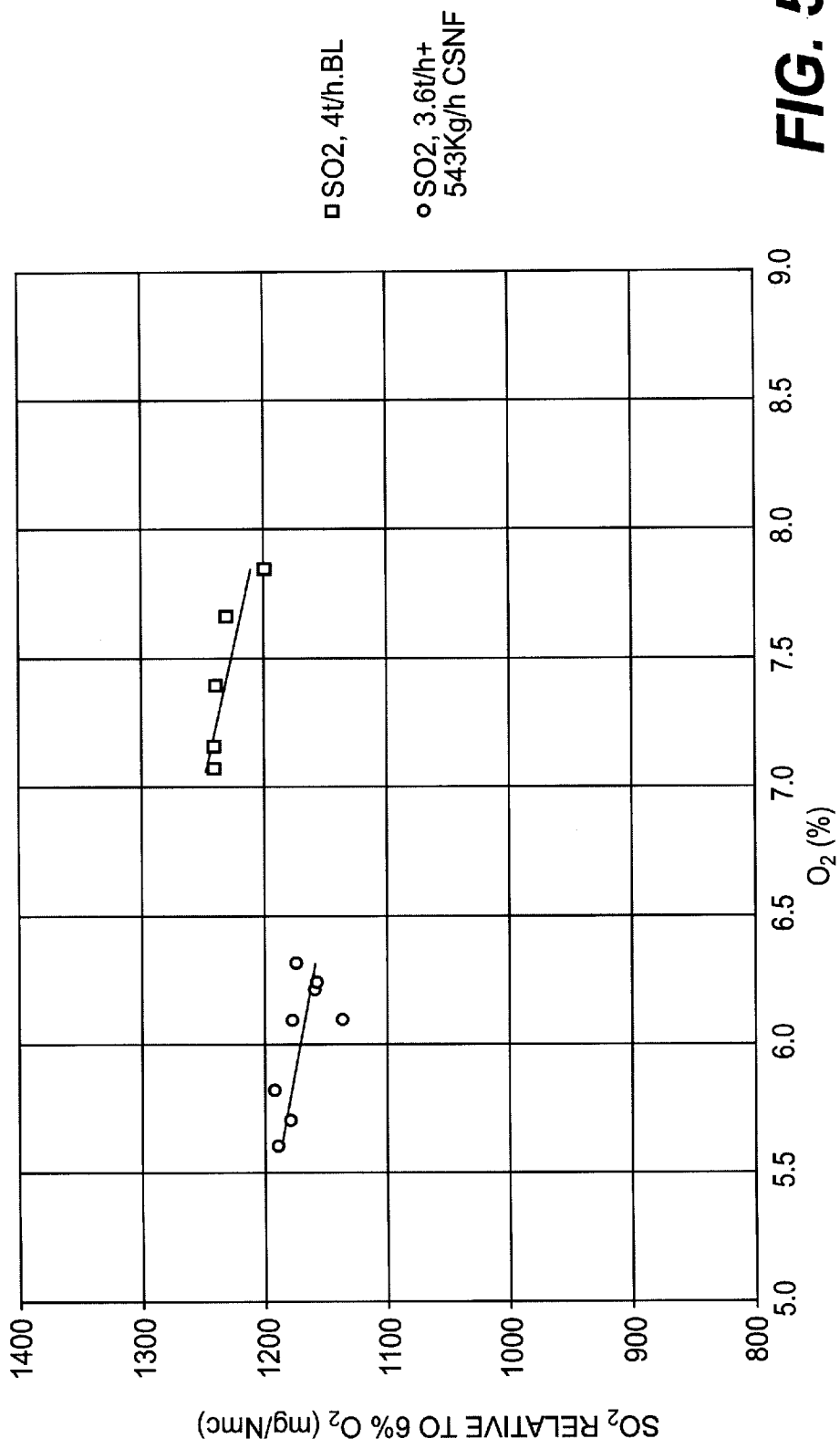
FIG. 5 is a diagram which shows the values of $SO_2$ which is formed in a combustion test carried out with coal dust alone, in comparison with a coal dust/NFSF co-combustion test.

The emission values for $NO_x$, CO, non-combusted materials in the fly ash and $SO_2$, obtained as the amount of excess air changes ($O_2\%$ in the vapours), is given in FIGS. 4 and 5, together with the data recorded during the baseline combustion.

The heavy ash (HA) collected in the boiler hopper was characterized and expressed in terms of residual percentage relative to the starting NFSF (FIG. 2). The non-combusted materials were of the order of 30–40%, compared with 5% recorded in the previous baseline test (FIG. 3).

At the end of the abovementioned test, while the boiler was in operating mode, the remaining NFSF was burnt, thus carrying out another short-duration test with a higher flow rate of NFSF. In this test, while still keeping the total heat input equal to about 33 tMW, the flow rate of NFSF was 774 kg/h, corresponding to an NFSF/coal weight ratio of about 24% and a heat input of about 15%.

The results obtained in terms of heavy ash and non-combusted materials are given in FIGS. 2 and 3.

V. Evaluation of the results

The amount of heavy ash produced in baseline mode with coal alone was 0.71% relative to the coal fed in, whereas the coal/NFSF co-combustion test gave a heavy ash value of 2.53% relative to the entire fuel material introduced (coal+NFSF).

The CO values show no significant changes (FIG. 4) and the slight increase found in the case of co-combustion (coal+NFSF) is due essentially to the small excess of air used.

Even for $NO_x$, the values are essentially the same (FIG. 4). The slight shift encountered in the co-combustion with NFSF falls within the results dispersion range and confirms that the formation of this microcontamination can essentially be attributed to the coal.

Figure 6:
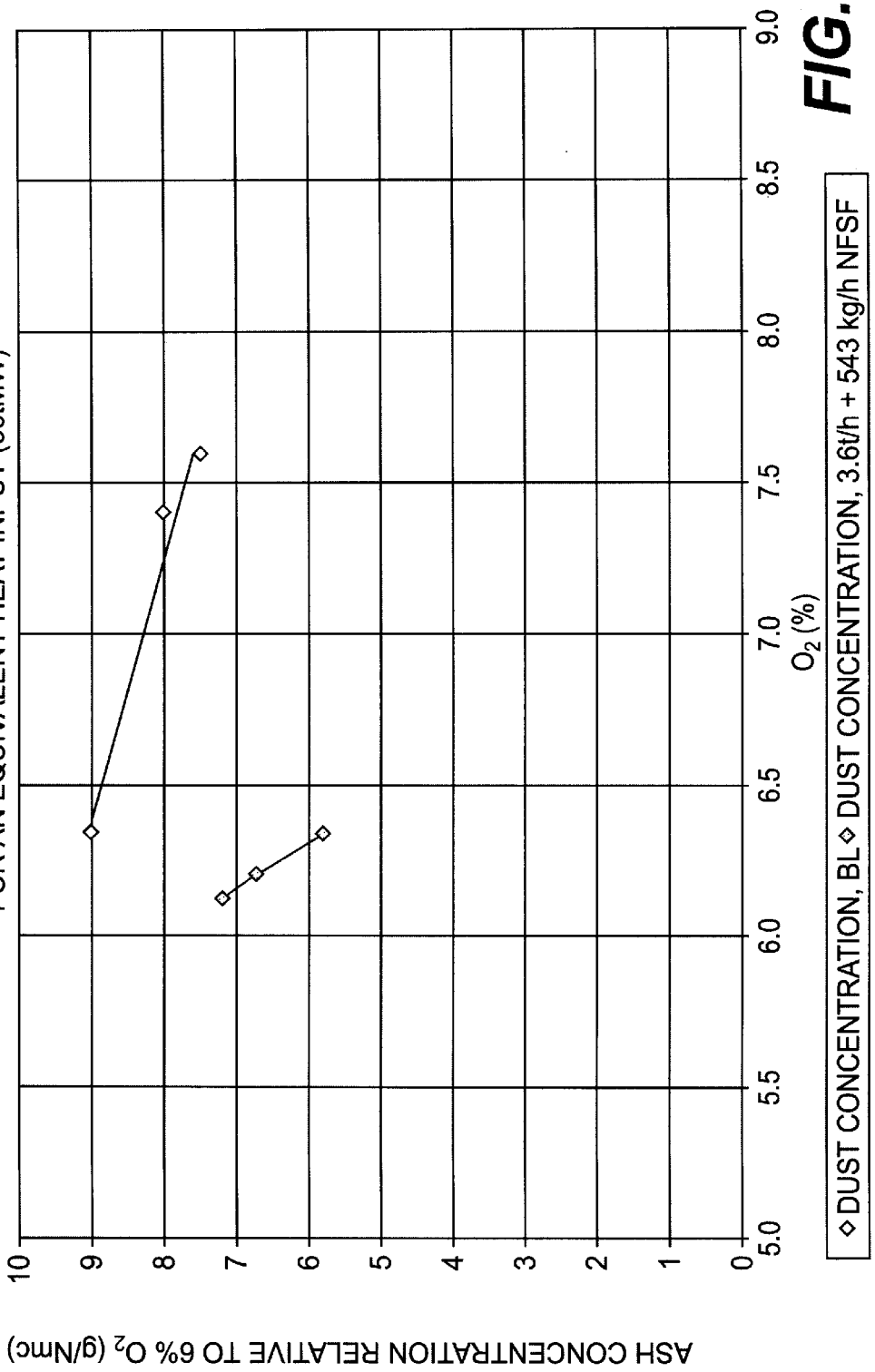
FIG. 6 is a diagram which shows the values of fly ash which is formed in a combustion test carried out with coal dust alone, in comparison with a coal dust/NFSF co-combustion test.

The amount of fly ash formed can also essentially be attributed to the amount of burnt coal (FIG. 6). The NFSF apparently produces no fly ash.

The non-combusted material values in the fly ash in coal/NFSF co-combustion were a few percentage points lower than those obtained in the baseline test.

Lastly, the conclusions which can be drawn following the abovementioned tests are that:

the co-combustion of an instantaneously combusting fossil fuel with NFSF is possible in the normal burners installed in power plants without needing to make particular modifications to these burners;

the NFSF behaves like a common instantaneously combusting solid fuel of moderate calorific power;

efficient grinding and/or shredding of its components reduces the level of non-combusted materials both in the heavy ash and in the fly ash, bringing it to levels similar to those of the instantaneously combusting fossil fuel burnt together with NFSF;

the $NO_x$ and CO levels are comparable with those of the fossil fuel burnt together with NFSF;

by virtue of the smaller sulphur content of the NFSF relative to coal, the $SO_2$ levels are proportionately lower;

there are no dioxins or furans present;

the PAHs are of the same type and at the same level as those which can be found with coal alone;

the level of halohydric acids and inorganic microcontaminants reflects the analytical composition of the NFSF;

heavy ash is predominant in the case of NFSF, while fly ash is predominant in the case of coal. On the one hand, the increased amount of heavy ash makes its extraction system more burdensome to manage, but this drawback is largely compensated for by the lower presence of fly ash which passes through the combustion chamber and, on reaching the convective bank, adhere to, soil, corrode, erode and reduce the heat exchange, thereby making it necessary to carry out frequent cleaning, preferably by blowing. Moreover, the fly ash which is not stopped by the convective bank comes to the filters and thus increases the frequency of interventions required to remove them.

What is claimed is:

1. A fuel composition, comprising:
   from 40 to 95% by weight of a fossil fuel; and
   from 60 to 5% by weight of a non-fossil solid fuel including a first fraction consisting of urban solid waste, a second fraction consisting of elastomeric polymer material and a third fraction consisting of non-elastomeric polymer material,
   wherein at least 90% by weight of the fuel composition fed into a burner is combusted in less than 10 seconds.

2. Composition according to claim 1, in which the amount of each of the three fractions is preselected as a function of the desired calorific power.

3. A fuel composition, comprising:

from 40 to 95% by weight of a fossil fuel; and from 60 to 5% by weight of particles less than 1 mesh in size of a non-fossil solid fuel including a first fraction consisting of urban solid waste, a second fraction consisting of elastomeric polymer material and a third fraction consisting of non-elastomeric polymer material, wherein at least 90% by weight of the fuel composition fed into a burner is combusted in less than 10 seconds.

4. Composition according to claim 3, in which the amount of each of the three fractions is preselected as a function of a desired calorific power.

5. Composition according to claim 3, in which the said non-fossil solid fuel consists of a mixture of from 40 to 80% by weight of dry urban solid waste, from 10 to 50% by weight of elastomeric polymer material and from 10 to 50% by weight of non-elastomeric polymer material.

6. Composition according to claim 5, in which the said mixture comprises from 60 to 80% by weight of dry urban solid waste, from 10 to 30% by weight of elastomeric polymer material and from 10 to 30% by weight of non-elastomeric polymer material.

7. A combustion method comprising the steps of:

feeding the flame of a burner of an instantaneous-combustion boiler with a flow of fuel composition including:

from 40 to 95% by weight of an instantaneously combusting fossil fuel; and from 60 to 5% by weight of a non-fossil solid fuel including a first fraction consisting of urban solid waste, a second fraction consisting of elastomeric polymer material and a third fraction consisting on non-elastomeric polymer material, which has been suitably treated so as to be instantaneously combustible;

combusting at least 90% by weight of said fuel composition fed into the burner in less than 10 seconds.

8. Combustion method according to claim 7, in which the amount of each of the three fractions is preselected as a function of a desired calorific power.

9. Combustion method according to claim 7, in which the said non-fossil solid fuel has an apparent density equal to or less than 0.6 g/cm$^3$.

10. Combustion method according to claim 7, in which the said non-fossil solid fuel consists of a mixture comprising from 40 to 80% by weight of dry urban solid waste, from 10 to 50% by weight of elastomeric polymer material and from 10 to 50% by weight of non-elastomeric polymer material.

11. Combustion method according to claim 10, in which the said mixture comprises from 60 to 80% by weight of dry urban solid waste, from 10 to 30% by weight of elastomeric polymer material and from 10 to 30% by weight of non-elastomeric polymer material.

* * * * *

UNITED STATES PATENT AND TRADEMARK OFFICE
CERTIFICATE OF CORRECTION

PATENT NO. : 6,375,691 B1
DATED : April 23, 2002
INVENTOR(S) : Zucchelli et al.

It is certified that error appears in the above-identified patent and that said Letters Patent is hereby corrected as shown below:

<u>Column 14,</u>
Line 4, "consisting on" should read -- consisting of --.

Signed and Sealed this

Twentieth Day of August, 2002

Attest:

JAMES E. ROGAN
Attesting Officer     Director of the United States Patent and Trademark Office